United States Patent
Ishii

(10) Patent No.: US 6,594,505 B1
(45) Date of Patent: Jul. 15, 2003

(54) MOBILE TELEPHONE SYSTEM CAPABLE OF COPING WITH A VARIETY OF MOBILE RADIO TELEPHONE SYSTEMS BY A SINGLE MOBILE RADIO TELEPHONE

(75) Inventor: Junichi Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/349,352

(22) Filed: Jul. 7, 1999

(30) Foreign Application Priority Data

Jul. 10, 1998 (JP) .......................................... 10/195469

(51) Int. Cl.⁷ ............................................. H04M 11/00
(52) U.S. Cl. ....................... 455/552; 455/419; 455/553; 375/130; 370/206
(58) Field of Search ................................. 455/552, 553, 455/550, 419, 448; 370/319, 465, 466, 469, 338, 335, 208; 375/220, 222, 141, 145

(56) References Cited

U.S. PATENT DOCUMENTS

| | | | | |
|---|---|---|---|---|
| 5,537,436 A | * | 7/1996 | Bottoms et al. ............. | 375/222 |
| 5,909,437 A | * | 6/1999 | Rhodes et al. .............. | 370/349 |
| 5,946,634 A | * | 8/1999 | Korpela ....................... | 455/552 |
| 6,006,105 A | * | 12/1999 | Rostoker et al. ............. | 455/552 |
| 6,112,093 A | * | 8/2000 | Nordlund .................... | 455/450 |
| 6,223,030 B1 | * | 4/2001 | Van Den Heuvel et al. | 455/422 |
| 6,240,122 B1 | * | 5/2001 | Miyashita ................... | 375/130 |

FOREIGN PATENT DOCUMENTS

| | | |
|---|---|---|
| CN | 1141111 A | 1/1997 |
| EP | 0852 448 A1 | 7/1998 |
| JP | 7-222227 | 8/1995 |
| JP | 8-130766 | 5/1996 |
| JP | 9-507986 | 8/1997 |
| JP | 10-84584 | 3/1998 |
| JP | 10-94051 | 4/1998 |
| WO | WO 96/14719 | 5/1996 |
| WO | WO 97/41704 | 11/1997 |

OTHER PUBLICATIONS

Abandoned, U.S. pat. No. 09/037,885, filed Mar. 10, 1998, Inventor, Miyashita, see p. 4, lines 21–26 of specification. Abandoned application information is printed on U.S. Patent No. 6,240,122.*

* cited by examiner

Primary Examiner—Dwayne Bost
Assistant Examiner—Joy K. Contee
(74) Attorney, Agent, or Firm—Scully, Scott, Murphy & Presser

(57) ABSTRACT

A mobile telephone system is capable of coping with a number of different mobile radio telephone systems by a single mobile radio telephone. When a mobile radio telephone exists inside a communication area of a first mobile radio telephone system, in case when a first mobile radio telephone system flag of a first base station and an existing second mobile radio telephone system flag of a second base station coincide with each other, the mobile radio telephone is to execute a mobile radio telephone communication using an existing mobile radio telephone communication protocol software. When the first and the second mobile radio telephone system flags do not coincide with each other, as downloading of a first mobile radio telephone communication protocol software used in the first base station is completed, a mobile radio telephone communication starts. The mobile radio telephone also executes a mobile radio telephone communication after downloading a second mobile radio telephone communication protocol software.

12 Claims, 6 Drawing Sheets

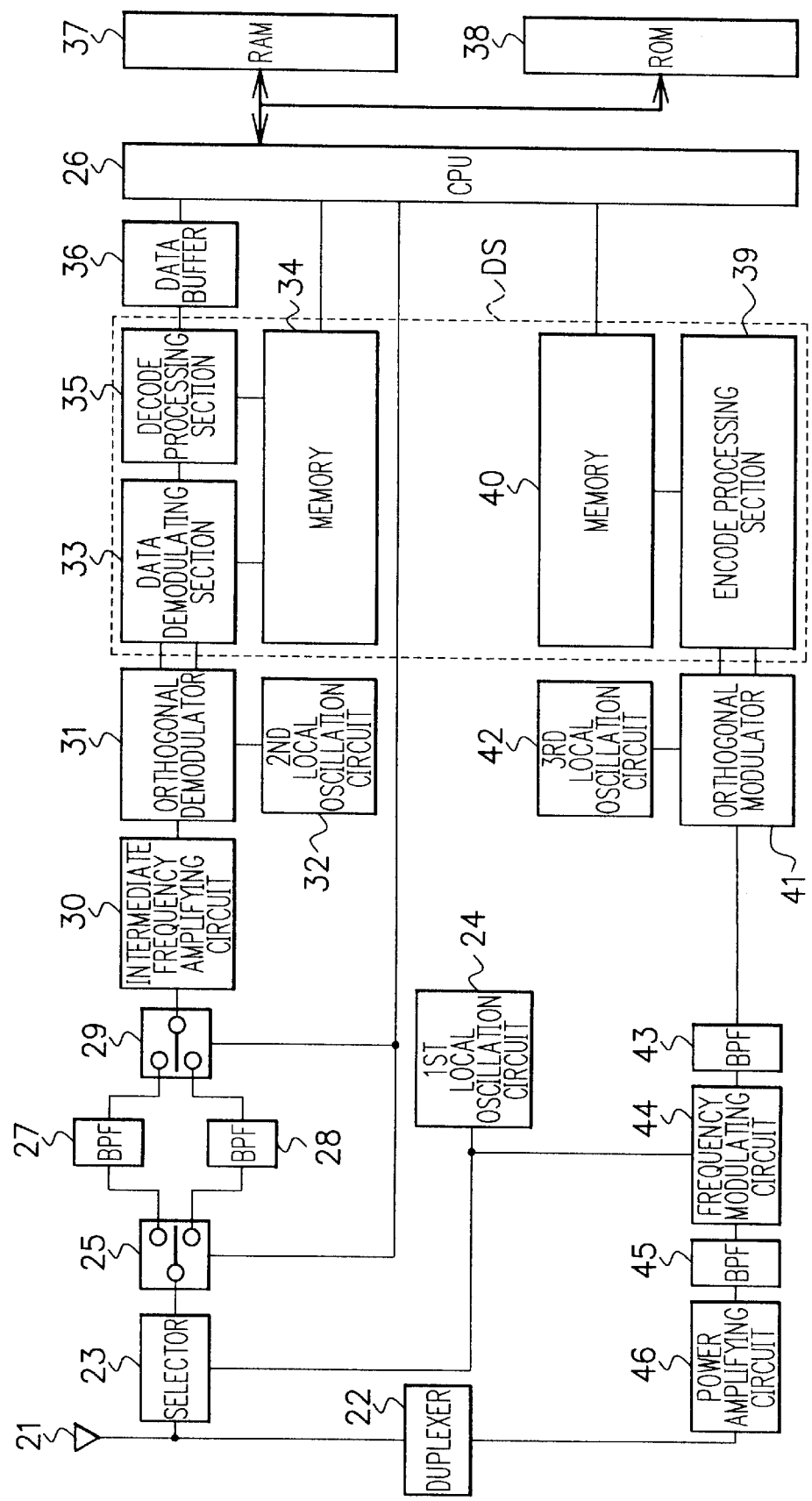

MOBILE TELEPHONE SYSTEM CAPABLE OF COPING WITH A VARIETY OF MOBILE RADIO TELEPHONE SYSTEMS BY A SINGLE MOBILE RADIO TELEPHONE

BACKGROUND OF THE INVENTION

The present invention relates to a mobile telephone system, in which more than two different mobile radio telephone systems are used by one mobile radio telephone serving as a single terminal. In particular, the present invention relates to a mobile telephone system which is capable of coping with a plurality of mobile radio telephone systems by the mobile radio telephone downloading software of a predetermined communication protocol etc., for communication by each mobile radio telephone system, using a communication means.

DESCRIPTION OF THE RELATED ART

Among a wide variety of conventional mobile systems where various kinds of systems can be selected according to priorities of a user, there is a mobile communication system as disclosed in Japanese Patent Laid-Open Publication No. 08-130766 which is capable of roaming and handing over between different systems.

A TDMA (Time Division Multiple Access) system, a CDMA (Code Division Multiple Access) system, a TDD (Time Division Duplex) system etc. have been used for conventional mobile communication devices. The TDMA system is a kind of system which in case when a plurality of stations in a same band is executing communication at the same time, assigns a particular period of time to the user where the user is able to communicate within that given period of time. The CDMA system is a kind of system which effects multiple access by a spread spectrum communication which spreads an information signal spectrum to a sufficiently wide band as compared to the original information band width. The TDD system is a kind of system in which spread sequence code directly cashes in on the information signals.

Japanese Patent Laid-Open Publication No. 07-222227 discloses a mobile communication device in which such TDMA/TDD system and CDMA/TDD system are combined, where a line of the mobile radio telephone is shared between two systems such that both systems are available for use.

Some examples as to implementation of such different systems to a mobile radio telephone would be, for instance with respect to currently used cellular phone systems in North America, an AMPS using frequency modulation (FM), a TDMA conducting time division multiple accessing using $\pi/4$ DQPSK, a CDMA conducting code division multiple accessing, a N-AMPS in which a band width is narrowed down to about half the AMPS due to frequency modulation etc.

Furthermore, there is a PCS system in which the frequency band of 800 MHz in the above-mentioned system is shifted to 1.9 GHz. It is quite obvious that a variety of systems have been used for the mobile radio telephone.

Regarding the terminals which are used with the above-mentioned systems, compounding of different frequency bands in a dual mode (dual band) has made some progress. For instance, such compounding of different frequency bands is meant for enabling operation in both 1.9 GHz and 800 MHz frequency bands. On the contrary, no attempt has been made to compound completely different multiplex systems (CDMA system and TDMA system).

Under such circumstances, each system has to be specialized, and there have been few occasions where each system would operate mutually.

Therefore, in case when the user wishes to benefit from services offered by various systems, the user has to have a different terminal for each system.

SUMMARY OF THE INVENTION

It is therefore an object of the present invention to solve the above-mentioned problems, and to provide a mobile telephone system which is used under a condition that the user does not have to possess an individual mobile radio telephone for each system but a single mobile radio telephone to cope with various systems, which enables the mobile radio telephone to be used in a wider range of service area, and which enables a major decrease in the memory capacity to be installed in the mobile radio telephone. Furthermore, in additionally applying a new communication system, the mobile telephone system of the present invention can cope with downloading of a communication protocol, and even when there are minor changes in the software of the mobile radio telephone, the mobile telephone system is capable of updating the software.

In order to achieve the above object, the present invention provides a mobile radio system comprising: a first base station corresponding to a first mobile radio telephone system; a second base station corresponding to a second mobile radio telephone system; and a mobile radio telephone, within a communication area of either said first base station or second base station, following a predetermined initial data communication protocol to compare a first mobile radio telephone system flag transmitted from said first base station or a second mobile radio telephone system flag transmitted from said second base station with an existing mobile radio telephone system flag to see whether they coincide with each other or not, and in such case when the two system flags coincide with each other, executing a mobile radio telephone communication in accordance with an existing mobile radio telephone communication protocol, while in such case when the two system flags do not coincide with each other, following said initial data communication protocol of the communication area of either said first base station or second base station where said mobile radio telephone is located at, so as to download a first or a second mobile radio telephone communication protocol software, and to execute a mobile radio telephone communication within said first or second communication area after downloading is completed.

In accordance with the present invention, in case when the mobile radio telephone is located inside the communication area of the first base station, the first mobile radio telephone system flag transmitted from the first base station and the existing second mobile radio telephone system flag transmitted from the second base station are compared, following the initial data communication protocol. When the first mobile radio telephone system flag and the existing second mobile radio telephone system flag coincide with each other, the existing mobile radio telephone communication protocol software being used in the previous communication is used to execute a mobile radio telephone communication.

On the other hand, when the first mobile radio telephone system flag and the second mobile radio telephone system flag do not coincide with each other, the first mobile radio telephone communication protocol software used in the first base station is downloaded, after which a mobile radio telephone communication starts in the communication area of the first base station.

Furthermore, in case when the mobile radio telephone moves from the communication area of the first base station to the communication area of the second base station, the second mobile radio telephone system flag transmitted from the second base station and the existing first mobile radio telephone system flag transmitted from the first base station used in the previous communication are compared in accordance with the initial data communication protocol, and since they are different, the second mobile radio telephone communication protocol software used in the second base station is downloaded on the basis of the initial data communication protocol, after which a mobile radio telephone communication starts in the communication area of the second base station.

Therefore, in accordance with the present invention, a single mobile radio telephone can cope with various systems, which enables the mobile radio telephone to be used in a wider range of service area, and which enables a major decrease in the memory capacity to be installed in the mobile radio telephone. Moreover, in additionally applying a new communication system, the present invention can cope with downloading of a communication protocol, and even when there are minor changes in the software, the system is capable of updating the software.

BRIEF DESCRIPTION OF THE DRAWINGS

The above and further objects and the novel feature of the invention will more fully appear from the following detailed description when the same is read in connection with the accompanying drawings, in which:

FIG. 6 is a block diagram showing a structure of the mobile radio telephone used in the second embodiment of the mobile radio system according to the present invention.

DESCRIPTION OF THE PREFERRED EMBODIMENTS

Figure 1:
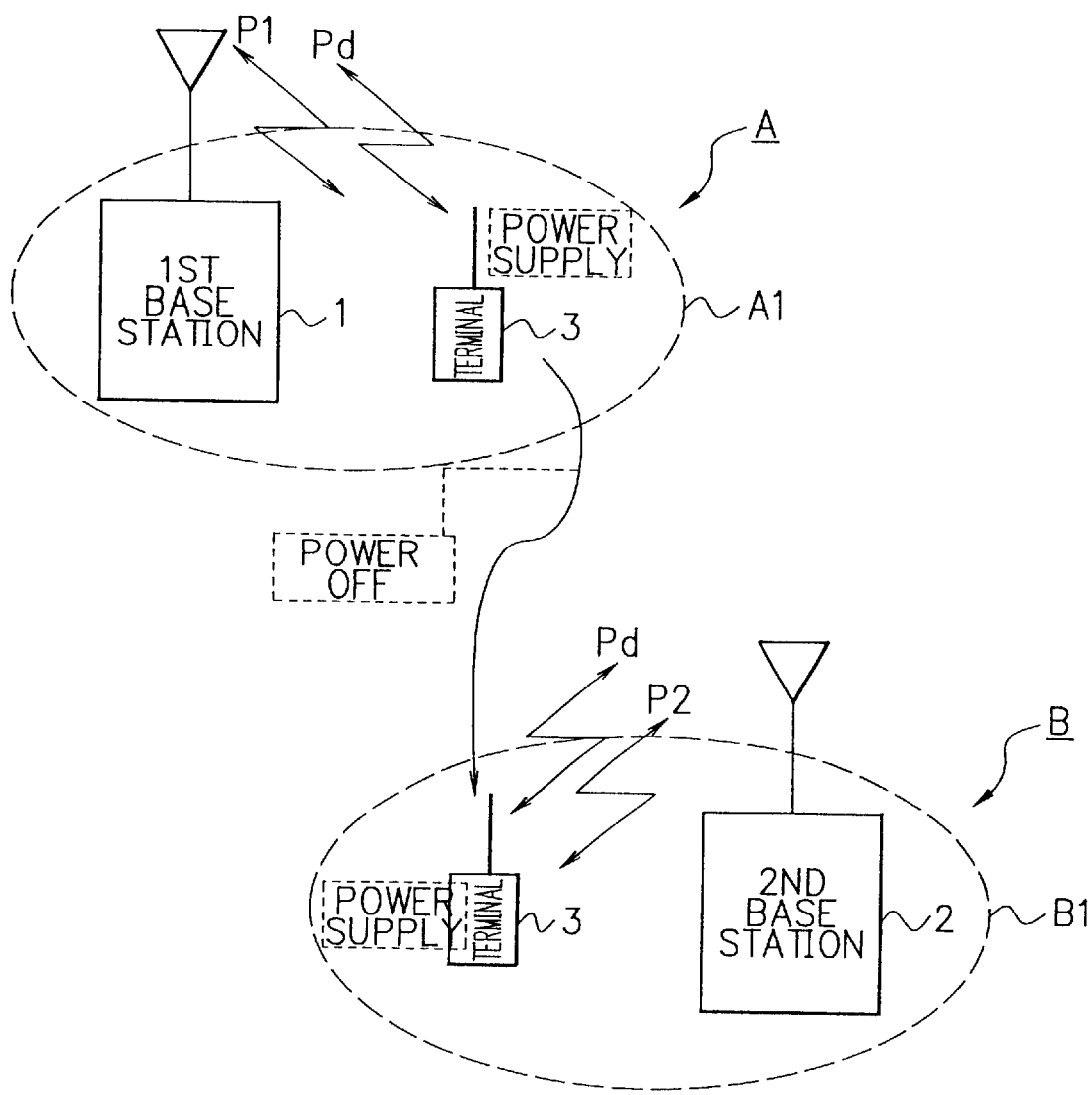
FIG. 1 is an explanatory structure diagram showing a structure of a first embodiment of a mobile telephone system according to the present invention.

Referring now to the drawings, a description of preferred embodiments of a mobile telephone system according to the present invention will be given in detail.

FIG. 1 is an explanatory structure diagram showing a structure of a first embodiment of the present invention.

The first embodiment illustrated in FIG. 1 is shown as implemented to typical mobile radio telephone systems.

The mobile telephone system of the first embodiment comprises a first base station 1 corresponding to a first mobile radio telephone system A; a second base station 2 corresponding to a second mobile radio telephone system B which is different from the first mobile radio telephone system A; and a mobile radio telephone 3 being a terminal for communicating between the first base station 1 in a communication area A1 of the first base station 1 and for communicating between the second base station 2 in a communication area B1 of the second base station 2.

In the first mobile radio telephone system A, the mobile radio telephone 3 uses an initial data communication protocol Pd and a first mobile radio telephone communication protocol P1 for communicating between the first base station 1 in the first communication area A1.

Likewise, as the mobile radio telephone 3 moves to the communication area B1 of the second base station 2, it uses the initial data communication protocol Pd and a second mobile radio telephone communication protocol P2 for communicating between the second base station 2 in the communication area B1.

With respect to the mobile telephone system of the first embodiment, internal structures of the first base station 1, the second base station 2 and the mobile radio telephone 3 will not be shown in the figure, and description as to detail operation of each internal structure will be omitted. The internal structures of those constituents are practically the same as an internal structure of a mobile radio telephone shown in FIG. 6, applied in a second embodiment of the present invention, which will be described later on.

As indicated, the internal structures of the first base station 1 and the second base station 2 shown in FIG. 1 are basically the same as that of the mobile radio telephone of the second embodiment illustrated in FIG. 6, and blocks of each station are provided in some numbers for each channel.

Figure 2:
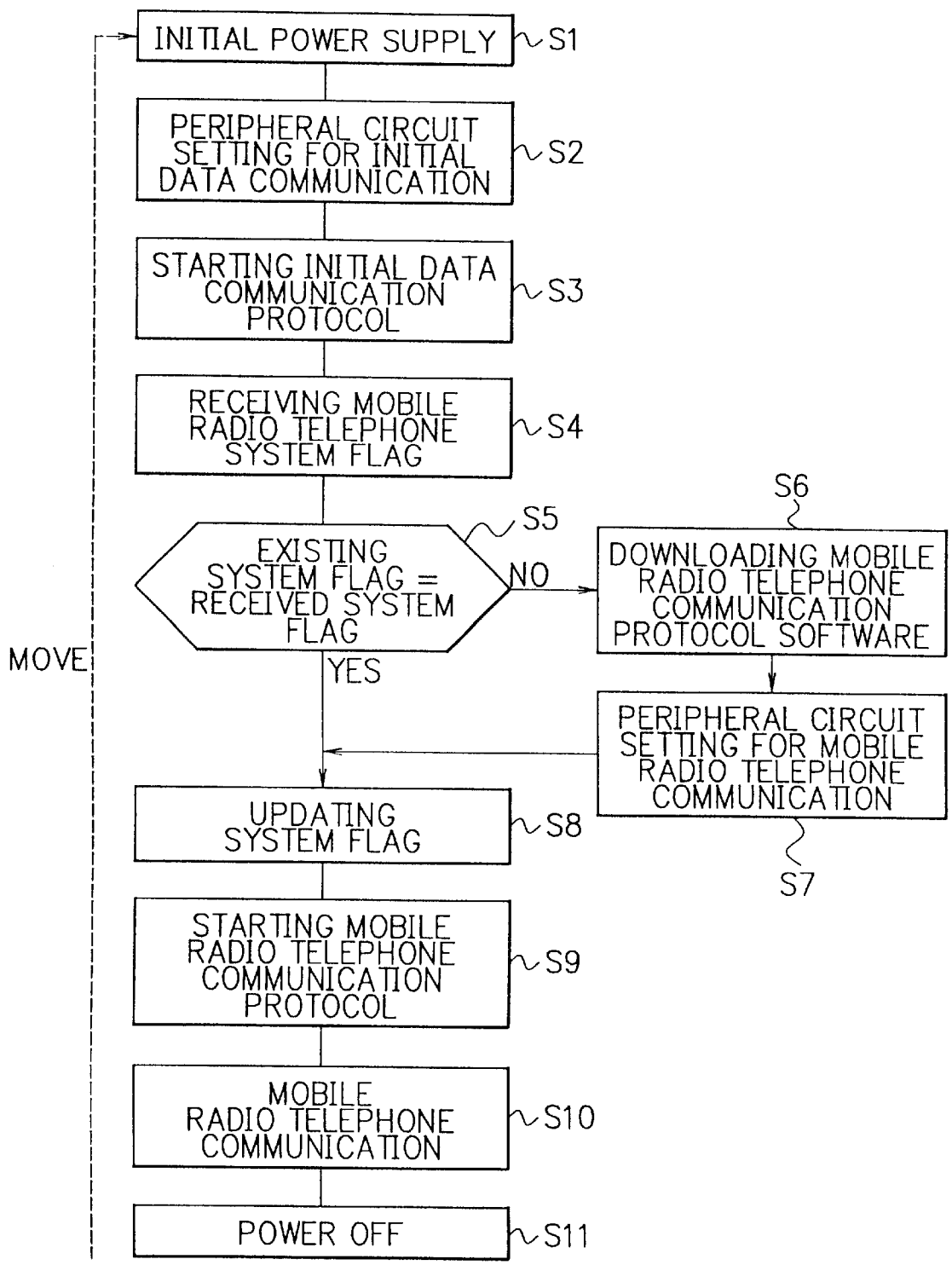
FIG. 2 is a flow chart showing a flow of operation of the mobile radio system as in the first embodiment of the invention.

Next, with reference to a flow chart in FIG. 2, a flow of operation of the mobile radio telephone 3 will be described, particularly regarding the operation in effecting a telephone communication between the mobile radio telephone 3 and the first base station 1 corresponding to the first mobile radio telephone system A, and between the mobile radio telephone 3 and the second base station 2 corresponding to the second mobile radio telephone system B.

As the mobile radio telephone 3 used in the first embodiment moves inside the communication area A1 of the base station 1 corresponding to the first mobile radio telephone system A, such that the mobile radio telephone 3 is located inside the communication area A1, power is supplied to the mobile radio telephone 3 (step S1). Then the mobile radio telephone 3 is to set a peripheral circuit for an initial data communication (step S2).

Then as the predetermined initial data communication protocol Pd starts a transmission from the first base station 1 (step S3), the mobile radio telephone 3 responds to the initial data communication protocol Pd and receives a first mobile radio telephone system flag which is transmitted from the first base station 1 (step S4).

Then the first mobile radio telephone system flag is compared with the existing mobile radio telephone system flag, which is previously used, to see whether the two flags coincide with each other (step S5).

As a result of this comparison, if the first mobile radio telephone system flag coincides with the already existing mobile radio telephone system flag, the existing mobile radio telephone communication protocol software which is being used in the previous communication is to be continuously used, and the mobile radio telephone 3 is to start a mobile radio telephone communication between the first base station 1 in the communication area A1.

On the other hand, if the first mobile radio telephone system flag does not coincide with the already existing mobile radio telephone system flag, the first mobile radio telephone communication protocol software used by the first base station 1 will be downloaded according to the initial data communication protocol Pd (step S6).

After the downloading of the first mobile radio telephone communication protocol software is completed, the mobile radio telephone 3 is to set the peripheral circuit for a mobile radio telephone communication (step S7).

Next, the system flag of the mobile radio telephone 3 is updated (step S8), and the first mobile radio telephone system flag and the existing radio telephone system flag are arranged to coincide with each other. Then as the first mobile radio telephone communication protocol becomes effective (step S9), the mobile radio telephone 3 is to conduct a mobile radio telephone communication between the first base station in the communication area A1 on the basis of the first mobile radio telephone communication protocol (step S10).

As the mobile radio telephone communication is finished, the user (not illustrated) turns off the power of the mobile radio telephone 3 (step S11).

Next, a description will be given on the operation in case when the mobile radio telephone 3 is moved from the communication area A1 available for the first base station 1 to the communication area B1 of the second base station 2 corresponding to the second mobile radio telephone system B, which is different from the first mobile radio telephone system A.

In case when the user moves the mobile radio telephone 3 from the communication area A1 of the first base station 1 to the communication area B1 of the second base station 2, the user once turns off the power of the mobile radio telephone 3 to stop the operation of the mobile radio telephone 3, in which state power is supplied to the mobile radio telephone 3 once again inside the communication area B of the second base station 2.

Like the procedures taken in the communication area A1 of the first base station 1, the mobile radio telephone 3 which has been power-supplied in the communication area B1 of the second base station 2 is to set the peripheral circuit of the mobile radio telephone 3 for an initial data communication.

Then the mobile radio telephone 3 is to receive a second mobile radio telephone system flag sent from the second base station 2 according to the predetermined initial data communication protocol Pd.

Furthermore, the second mobile radio telephone system flag is compared with the already existing first mobile radio telephone system flag (used in the previous communication), to see whether the second mobile radio telephone system flag and the first mobile radio telephone system flag coincide with each other.

In this case, since the mobile radio telephone 3 is located inside the communication area B1 of the second base station 2, the first mobile radio telephone system flag and the second mobile radio telephone system flag are to be different from each other.

Therefore, according to the initial data communication protocol Pd, the mobile radio telephone 3 is to download the second mobile radio telephone communication protocol software which is used by the second base station 2.

When the downloading of the second mobile radio telephone communication protocol software is completed, a mobile radio telephone communication in the communication area B1 of the second base station 2 starts.

In this way, in the first embodiment, a single mobile radio telephone 3 copes with a plurality of different mobile radio telephone systems such as the first mobile radio telephone system A and the second mobile radio telephone system B. Therefore, it is possible to use the mobile radio telephone 3 in a wider range of service area.

Moreover, even in case when a new communication system is added, the present invention is capable of downloading a communication protocol, and thus the user does not have to purchase any additional terminal, i.e. an additional mobile radio telephone, every time a new communication system is additionally applied.

In addition, even in case when minor changes occur in the software, it is possible to update the software of the mobile radio telephone by updating the data transmitted from the base station.

Next, a second embodiment of the present invention will be described. The second embodiment shows an example of a combination with the existing mobile radio telephone system currently used in North America, in which dynamic switching of the communication protocol is executed.

Figure 3:
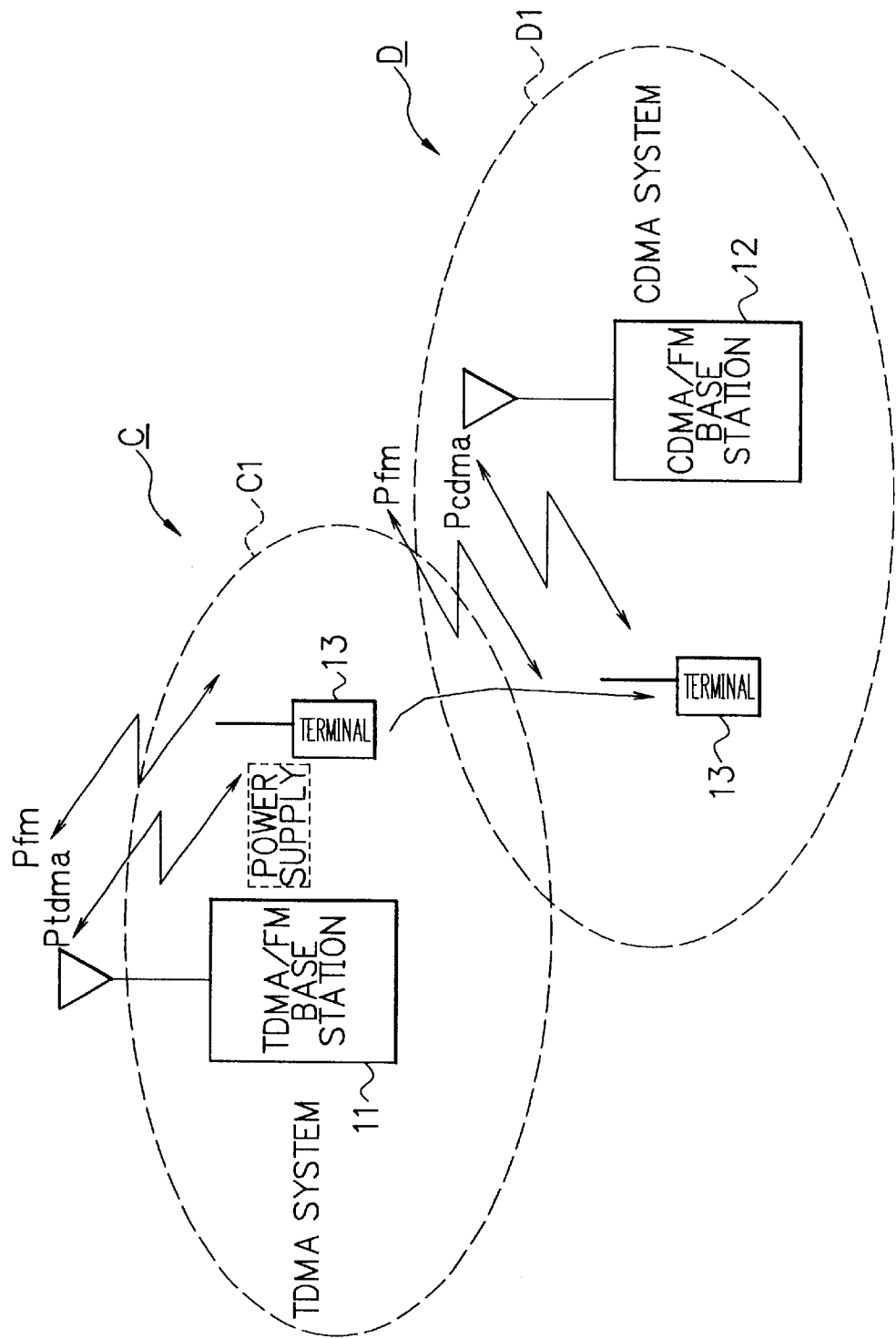
FIG. 3 is an explanatory structure diagram showing a structure of a second embodiment of the mobile radio system according to the present invention.

FIG. 3 is an explanatory structure diagram showing a system structure of the second embodiment. In FIG. 3, as the first base station corresponding to a TDMA system C serving as the first mobile radio telephone system, there is a base station 11 in a dual mode of TDMA and FM (to be referred to in the following as TDMA/FM base station 11), which effects mobile telephone communications with a mobile radio telephone 13 serving as a terminal, inside a communication area Cl of the TDMA system C.

Within the communication area C1 of the TDMA system C, initial power will be supplied prior to the actual practicing of a mobile radio telephone communication between the mobile radio telephone 13 and the TDMA/FM base station 11.

Once the power is supplied to the mobile radio telephone 13, the mobile radio telephone 13 is to set the peripheral circuit to the FM mode for an initial data communication, and receive the TDMA system flag transmitted from the TDMA/FM base station 11 according to a FM data communication protocol Pfm, which is to be determined by the mobile radio telephone 13 whether or not it coincides with the existing system flag possessed by the mobile radio telephone 13.

Furthermore, as the mobile radio telephone 13 moves to a communication area D1 of a CDMA system D serving as the second mobile radio telephone system, it becomes possible for the mobile radio telephone 13 to effect a mobile radio telephone communication between a CDMA/FM base station 12 in a dual mode of CDMA and FM, serving as the second base station.

In case when the mobile radio telephone 13 is moved to the communication area D1 of the CDMA/FM base station 12, where the mobile radio telephone 13 receives information of the CDMA/FM base station 12 in the mobile radio telephone communication using a TDMA communication protocol Ptdma, the mobile radio telephone 13 is to confirm with the user whether roaming from the TDMA system C to the CDMA system D should be allowed or not.

Figure 4:
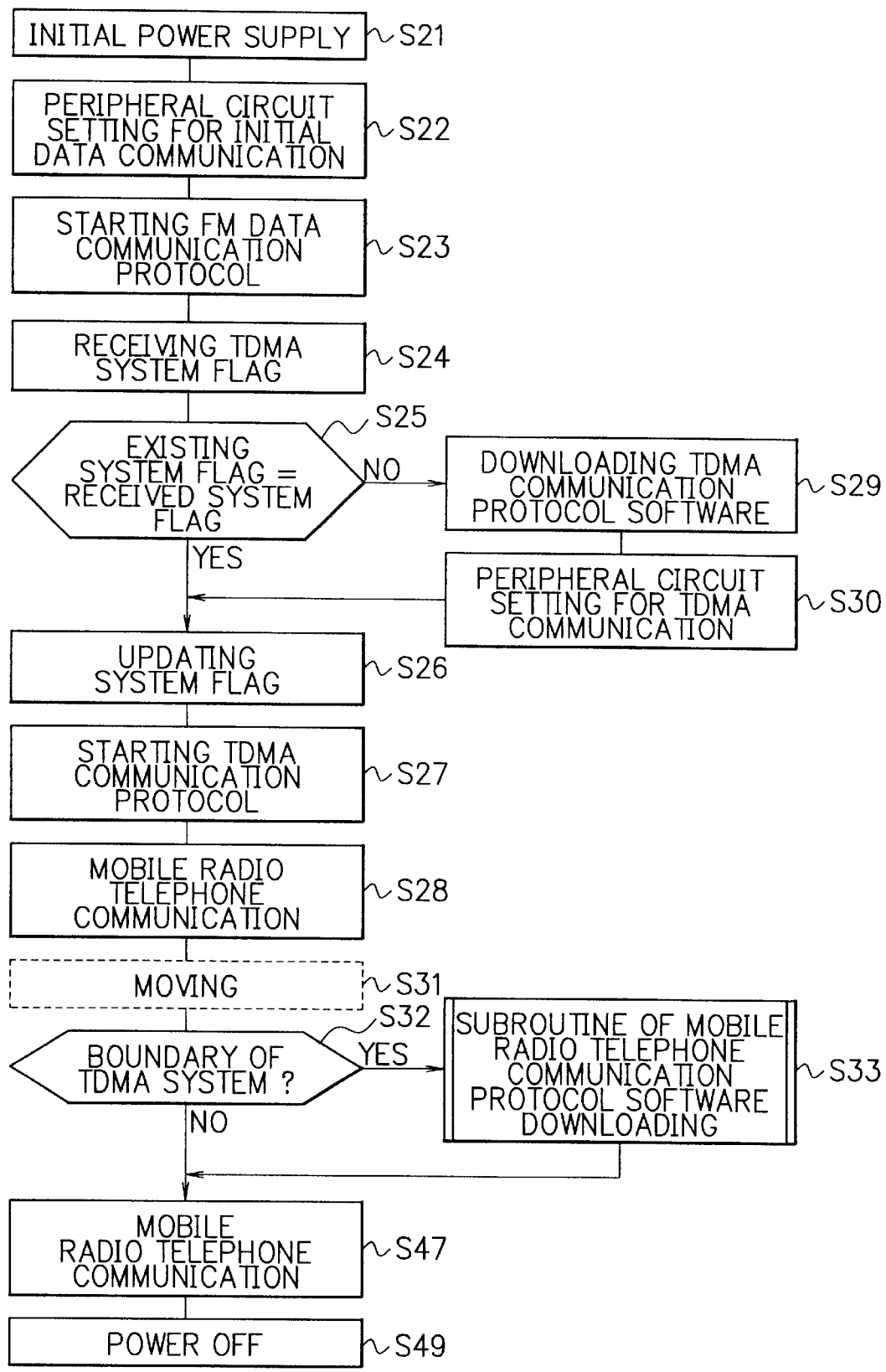
FIG. 4 is a flow chart showing a flow of operation of the mobile radio system as in the second embodiment of the invention.

Next, operation of the second embodiment will be described with reference to the flow charts in FIG. 4 and FIG. 5. Referring first to FIG. 4, in case when the mobile radio telephone 13 possessed by the user is moved within the range of the communication area C1 of the TDMA/FM base station 11 in the TDMA system C, as power supply data is transmitted to the mobile radio telephone 13 from the TDMA/FM base station 11, initial power is supplied to the mobile radio telephone 13 (step S21). Then as a following procedure, the mobile radio telephone 13 is to set the peripheral circuit to the FM mode for an initial data communication (step S22).

As the mobile radio telephone 13 completes setting the peripheral circuit for a FM data communication, a FM data communication protocol Pfm becomes effective (step S23), and then the mobile radio telephone 13 receives the TDMA system flag from the TDMA/FM base station 11 according to the FM data communication protocol Pfm (step S24).

Then the existing system flag that the mobile radio telephone 13 possesses is compared with the TDMA system flag to determine whether they coincide with each other (step S25). When it is determined that the TDMA system flag and the existing flag coincide with each other as a result of such comparing process, the TDMA/FM base station 11 is to update the TDMA system flag (step S26). The mobile radio telephone 13 then sets the peripheral circuit for a TDMA communication, and continuously uses the existing TDMA communication protocol Ptdma (step S27), so as to effect a mobile radio telephone communication between the mobile radio telephone 13 and the TDMA/FM base station 11 (step S28).

On the other hand, when it is determined at step S25 that the existing system flag possessed by the mobile radio telephone 13 does not coincide with the TDMA system flag, TDMA communication protocol software is downloaded in the FM mode continuously on the basis of the FM data communication protocol Pfm (step S29).

As the downloading of the TDMA communication protocol software in the FM mode is completed, the mobile radio telephone 13 is to set the peripheral circuit for a TDMA communication (step S30). Then like in the procedure taken at step S26, where the existing system flag and the TDMA system flag coincide with each other, the system flag is updated to the TDMA system. The TDMA communication protocol Ptdma is used (the same procedure taken at step S27), and a mobile radio telephone communication is effected (the same procedure taken at step S28).

Next, operation in a case where the user is moved from the communication area C1 of the TDMA system C to the communication area D1 of the CDMA system D will be described with reference to the flow charts shown in FIG. 4 and FIG. 5.

In FIG. 4, as the user moves to the communication area C1 of the TDMA/FM communication station 11 (step S31), and further to a boundary of the communication area C1 (step S32), the procedure will enter into a subroutine of the mobile radio telephone communication software (step S33). Then the process will move on to the subroutine as shown in FIG. 5.

Figure 5:
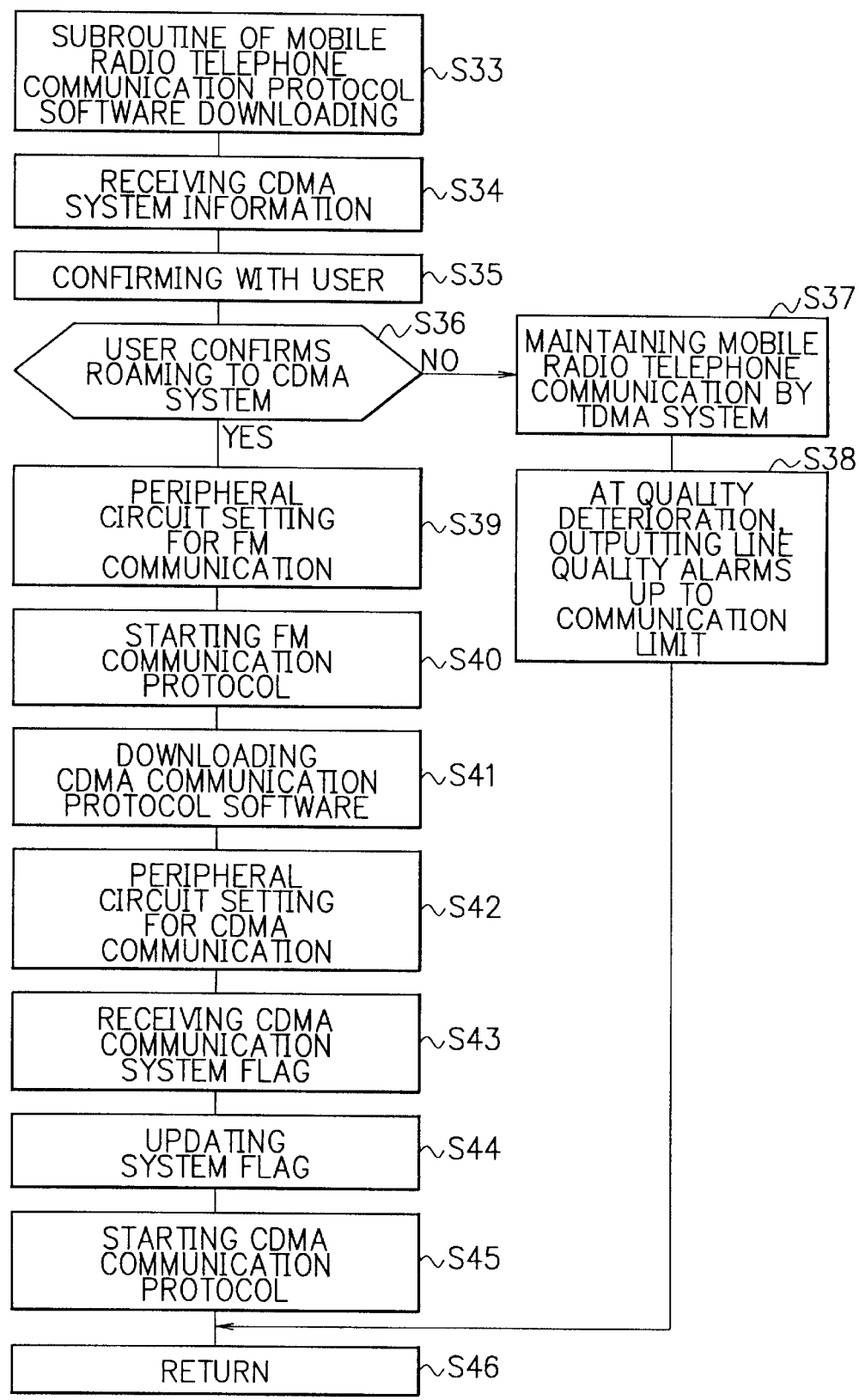
FIG. 5 is a flow chart showing a subroutine process of the mobile radio telephone in the second embodiment of the mobile radio system, as the user has moved to a boundary of a communication area of a TDMA/FM base station.

In the subroutine described in the flow chart of FIG. 5, as the mobile radio telephone 13 reaches the boundary of the communication area C1 of the TDMA system C, and as it receives information of the adjacent CDMA/FM base station 12 in a dual mode of CDMA and FM in a mobile radio telephone communication using the TDMA communication protocol Ptdma (step S34), the mobile radio telephone 13 is to confirm with the user whether roaming from the TDMA system C to the CDMA system D should be allowed or not (step S35).

In case when the user does not allow the roaming from the TDMA system C to the CDMA system D, a mobile radio telephone communication using the TDMA communication protocol Ptdma between the mobile radio telephone 13 and the TDMA/FM base station 11 will continue (step S37). When the communication quality deteriorates during this mobile radio telephone communication, the communication will be maintained until it hits the limit by letting out line quality alarms etc.(step S38).

Then in the mobile radio telephone communication using the TDMA communication protocol Ptdma, the mobile radio telephone 13 is to receive information from the adjacent CDMA system. In this occasion, if the user allow the roaming to the CDMA system D (step S36), the mobile radio telephone 13 is to set the peripheral circuit for a FM data communication (step S39), use the FM data communication protocol Pfm transmitted from the CDMA/FM base station 12 (step S40), and download the CDMA communication protocol software (step S41).

As the mobile radio telephone 13 completes downloading the software of the CDMA communication protocol, it sets the peripheral circuit for a CDMA communication (step S42). The mobile radio telephone 13 then receives the CDMA communication system flag from the CDMA/FM base station 12 (step S43), and updates the system flag to the CDMA system flag (step S44). Then the mobile radio telephone 13 uses the CDMA communication protocol Pcdma (step S45), returns to the procedure in the flow chart of FIG. 4 (step S46), so as to execute a mobile radio telephone communication between the CDMA/FM base station 12 (step S47).

When the mobile radio telephone communication is over, the power of the mobile radio telephone 13 is turned off (step S49).

During such process, if the user turns off the power of the mobile radio telephone 13 and supplies power to it within the communication area D1 of the CDMA/FM base station 12, being a base station in a dual mode of CDMA and FM, the mobile radio telephone 13 will set the peripheral circuit for a FM data communication, and follows the FM data communication protocol Pfm to receive the CDMA system flag from the CDMA/FM base station 12.

The mobile radio telephone 13 in response to receiving the CDMA system flag, will confirm with the user whether roaming to the CDMA system should be allowed or not. In case when the user permits the roaming, the mobile radio telephone 13 will follow the FM data communication protocol Pfm, so as to download the CDMA communication protocol software in the FM mode.

As the downloading of the CDMA communication protocol software in the FM mode is completed, the mobile radio telephone 13 is to set the peripheral circuit for a CDMA communication, updates the system flag to the CDMA, and executes a mobile radio telephone communication using the CDMA communication protocol Pcdma.

In order to have communication protocols capable of coping with a number of different communication systems such as TDMA, CDMA etc. dealt by a single radio terminal, usually a large memory capacity is required. However, according to the second embodiment, each communication protocol software using a smaller-scale data communication protocol is downloaded as occasion demands, which enables considerable decrease in the memory area.

Next, with reference to FIG. 6, a structure of the mobile radio telephone 13 serving as the terminal in the second embodiment will be described. Operation of the mobile radio telephone 13 will be also described with reference to FIG. 6, particularly as to a case where the mobile radio telephone system is to be switched.

In the second embodiment, the mobile radio telephone 13 has an antenna 21 which receives and transmits radio waves between the base station. As the antenna 21 receives a radio wave from the base station, the radio wave from the antenna 21 is outputted to a selector 23 in accordance with the receiving band. On the other hand, a transmission signal from a duplexer 22 being distinguished on the basis of a transmitting band at a time of transmission is transmitted to the base station through the antenna 21 as a radio wave.

The selector 23 is to select a signal from the base station inputted from the antenna 21 according to an output from a first local oscillation circuit 24, in order to output the signal to a first switching circuit 25.

An output from the first switching circuit 25 is switched to be transmitted to a first BPF (band pass filter) 27 or a second BPF 28. Switch control of the switching circuit 25 is based on the control by the CPU 26. An output from the first BPF 27 or the second BPF 28 is to be inputted to a second switching circuit 29.

The second switching circuit 29 is to switch and select between the outputs from the first BPF 27 and the second BPF 28 on the basis of the switch control by the CPU 26.

An output signal from the second switching circuit 29, i.e. an output signal from either the first BPF 27 or the second BPF 28 is outputted to an intermediate frequency amplifying circuit 30. Then an output signal from the intermediate frequency amplifying circuit 30 is to be transmitted to an orthogonal demodulator 31. The orthogonal demodulator 31 also receives an output signal from a second local oscillation circuit 32.

In response to receiving the output signal from the intermediate frequency amplifying circuit 30 and the output signal from the second local oscillation circuit 32, the orthogonal demodulator 31 is to output an in-phase signal si and an orthogonal signal sq.

The in-phase signal si and the orthogonal signal sq are to be outputted to a data demodulating section 33. Having been inputted the in-phase signal si and the orthogonal signal sq, the data demodulating section 33 is to demodulate the data so as to output the demodulated data to a first memory 34 and to a decode processing section 35.

The decode processing section 35 is to input an output signal from the data demodulating section 33 so as to decode the signal for outputting it to the first memory 34 and a data buffer 36.

In this way, a reception signal processing means is constructed by the selector 23, the first switching circuit 25, the first BPF 27, the second BPF 28, the intermediate frequency amplifying circuit 30, the orthogonal demodulator 31, the second local oscillation circuit 32, the data demodulating section 33, the first memory 34, and the decode processing section 35.

The first memory 34 is to store the output signal from the data demodulating section 33, and the output signal from the decode processing section 35 on the basis of the control by the CPU 26.

The data buffer 36 is provided for temporarily storing an output signal from the decode processing section 35 in accordance with the control by the CPU 26.

The CPU 26 is to transmit and receive data between a RAM 37 and a ROM 38.

The RAM 37 is a memory section used on the basis of computation by the CPU 26. The ROM 38 is a memory section for storing an arithmetic program of the CPU 26.

In this ROM 38, a peripheral circuit setting parameter for a FM communication, algorithm of the data demodulating section 33 and the decode processing section 35 required in the FM signal demodulation, system flags etc. are previously stored.

The CPU 26, the RAM 37, and the ROM 38 are constituting a storage and control section.

An output of the CPU 26 is to be inputted to an encode processing section 39. The encode processing section 39 is to encode the output from the CPU 26, so as to output it to a second memory 40 and to an orthogonal modulator 41.

The second memory 40 serves to store an output signal from the encode processing section 39 on the basis of the control by the CPU 26.

A digital signal processing section DS shown as encircled by a broken line is constructed such that it includes the data demodulating section 33, decode processing section 35, the first memory 34, the second memory 40, and the encode processing section 39.

The orthogonal modulator 41 is to receive an output signal from the encode processing section 39 and an output signal from a third local oscillation circuit 42, so as to execute an orthogonal modulation over the output signal from the encode processing section 39 and output the signal to a third BPF 43.

The third BPF 43 is to set a limit to a band of the output signal from the orthogonal modulator 41, and an output signal from the third BPF 43 is to be transmitted to a frequency modulating circuit 44.

The frequency modulating circuit 44 is to input an output signal from the BPF 43, and an output signal from the first local oscillation circuit 24, so as to have the signal frequency-modulated to be outputted to a fourth BPF 45.

The fourth BPF 45 is to band-limit the output signal from the frequency modulating circuit 44, so as to output the signal to a power amplifying circuit 46.

An output from the power amplifying circuit 46 is to be transmitted to the antenna 21 through the duplexer 22 to be further transmitted to the base station as a radio wave.

The encode processing section 39, the orthogonal modulator 41, the third local oscillation circuit 42, the third BPF 43, the first local oscillation circuit 24, the frequency modulating circuit 44, the fourth BPF 45, and the duplexer 22 are to constitute the transmission signal processing means.

Next, operation of a situation in which the mobile radio telephone 13 is to execute communication by each of FM, TDMA, and CDMA communication protocols will be described.

When power is supplied to the mobile radio telephone 13, the CPU 26 is to read out a peripheral circuit setting parameter for a FM communication, which is stored in a predetermined area within the ROM 38. Then the CPU 26 is to output a control signal to the first switching circuit 25 and the second switching circuit 29, which set a pass of a receiving circuit in accordance with the peripheral circuit setting parameter for a FM communication.

Subsequently, the algorithm of the data demodulating section 33 and the decode processing section 35 possessed by the digital signal processing section DS, which is required in the FM signal demodulation is read out from the ROM 38 by the CPU 26, to be outputted to the first memory 34.

In addition, the CPU 26 is to read out from the ROM 38 the algorithm for executing FM modulation by the encode processing section 39 included in the transmission block inside the digital signal processing section DS, so as to output the algorithm to the second memory 40.

In this way, after the setting of the peripheral circuit is completed, the FM data communication protocol Pfm which is transmitted from the base station in the FM mode is received by the antenna 21, after which it is inputted to the orthogonal demodulator 31 via the selector 23, the first BPF 27 or the second BPF 28 which is being selected and switched by the CPU 26, the second switching circuit 29, and the intermediate frequency amplifying circuit 30.

To the orthogonal demodulator 31, a local oscillation signal from the second local oscillation circuit 32 is inputted, data of FM data communication protocol Pfm is demodulated, and then the orthogonal signal sq and the in-phase signal si is outputted to the data demodulating section 33.

The data demodulating section 33 inputs both the orthogonal signal sq and the in-phase signal si, demodulates the data of the FM data communication protocol Pfm so as to have the demodulated data stored in the first memory 34 and outputted to the decode processing section 35 at the same time.

The decode processing section 35 decodes the data of the FM data communication protocol Pfm which is being demodulated at the data demodulating section 33, so as to store the decoded data of the FM data communication protocol Pfm to the first memory 34, and also transmit the decoded data to the data buffer 36 where the data is temporarily stored.

The decoded data of the FM data communication protocol Pfm stored in the data buffer 36 is to be compared at the CPU 26 with a system flag which is stored in the ROM 38.

In case when the system flag does not coincide with the decoded data, an area of communication protocol software which is stored in the ROM 38 is to be changed in accordance with the data transmitted from the base station.

In case of TDMA and CDMA, the same operation is conducted, and in case when the system flag does not coincide with the decoded data, an area of communication protocol software which is stored in the ROM 38 is to be changed in accordance with the data transmitted from the base station.

In the second embodiment of the present invention, the communication protocol to be used at a time of the initial power supply is set to the FM mode, according to the assumption that both the CDMA system base station and the TDMA system base station are commonly supporting the FM mode.

The communication protocol software in the FM mode, even when it is compared with other communication protocol software, can do with a smaller-scale memory size, and therefore, it is capable of storing a program which has gone through mask ROM to the terminal body itself, while the program can be used whenever occasion demands.

Furthermore, in the second embodiment, as for the ROM 38 for storing a large-scale protocol software such as TDMA and CDMA, an electrically rewritable device such as a flash memory is used.

In accordance with the present invention, software corresponding to each of a plurality of mobile radio telephone systems is previously downloaded to the mobile radio telephone for use, such that it is possible to cope with a variety of mobile radio telephone systems. Therefore, considering the conventional cases where individual mobile radio telephone has to be used for each system, the present invention is capable of coping with a plurality of systems by a single mobile radio telephone, by which the mobile radio telephone can be used in a wider range of service area.

Furthermore, in case when a single device has a communication protocol capable of coping with a plurality of systems such as TDMA and CDMA, the conventional mobile radio telephone has to have a quite large area of memory. In the present invention, however, each communication protocol software is of a smaller-scale data communication protocol which could be downloaded, as occasion demands. Therefore, it is possible to decrease the memory area in a considerable extent.

Furthermore, even in case when additional communication systems are newly added, the situation can be dealt with by downloading a communication protocol. Consequently, a user does not have to newly purchase any mobile radio telephone to cope with additional systems.

In addition, even when there are minor changes in the software, the software of the terminal can be updated by updating the data transmitted from the base station.

While preferred embodiments of the invention have been described using specific terms, such description is for illustrative purposes only, and it is to be understood that changes and variations may be made without departing from the spirit or the scope of the following claims.

What is claimed is:

1. A mobile radio system comprising:
    a first base station corresponding to a first mobile radio telephone system;
    a second base station corresponding to a second mobile radio telephone system; and
    a mobile telephone comprising:
        (a) a transmission signal processing means executing an orthogonal modulation over a transmission signal so as to transmit the signal as a radio wave to said first base station or said second base station through an antenna; and
        (b) a reception signal processing means receiving a transmission signal from said first base station or said second base station through said antenna so as to execute an orthogonal demodulation over the signal to demodulate and decode data;
    wherein the mobile telephone being programmed so that when said mobile phone is within a communication area of either said first base station or second base station, following a predetermined initial data communication protocol to compare a first mobile radio telephone system flag transmitted from said first base station or a second mobile radio telephone system flag transmitted from said second base station with an existing mobile radio telephone system:
        (a) in such case when the two system flags coincide with each other: executing a mobile radio telephone communication in accordance with an existing mobile radio telephone communication protocol; and
        (b) in such case when the two system flags do not coincide with each other: following said initial data communication protocol of the communication area of either said first base station or second base station where said mobile radio telephone is located, so as to download a first or a second mobile radio telephone communication protocol software, and executing a mobile radio telephone communication within said second communication area after downloading is completed;
    the mobile telephone further comprising a CPU, wherein response to a power supply, said CPU being programmed for:
        reading out a peripheral circuit setting parameter for a communication on the basis of a mobile radio telephone communication protocol corresponding to said first or second mobile radio telephone system stored in a storage means and controlling to set a pass of receiving circuit, reading out from said storage means an algorithm necessary for said reception signal processing means to demodulate and decode said mobile radio telephone communication protocol, reading out from said storage means an algorithm necessary for said transmission signal processing means to execute an orthogonal modulation over a transmission signal, controlling to set the peripheral circuit.

2. A mobile telephone system as claimed in claim 1, wherein response to a power supply, said CPU being programmed for:

comparing a base station system flag, defined by processing contents of demodulating and decoding of said mobile radio telephone communication protocol by said reception signal processing means, with said mobile telephone system flag stored in said storage means, and in case when the two do not coincide as a result of the comparison, updating the system flag stored in, the storage means on the basis of data of said mobile radio telephone communication protocol.

3. A mobile radio system as claimed in claim 1, wherein; said first base station is a base station in a dual mode of TDMA and FM.

4. A mobile radio system as claimed in claim 2, wherein; said second base station is a base station in a dual mode of CDMA and FM.

5. A mobile radio system as claimed in claim 3, wherein; said second base station is a base station in a dual mode of CDMA and FM.

6. A mobile radio system as claimed in claim 2, wherein; said first mobile radio telephone system is a TDMA system.

7. A mobile radio system as claimed in claim 3, wherein; said first mobile radio telephone system is a TDMA system.

8. A mobile radio system as claimed in claim 5, wherein; said first mobile radio telephone system is a TDMA system.

9. A mobile radio system as claimed in claim 2, wherein; said second mobile radio telephone system is a CDMA system.

10. A mobile radio system as claimed in claim 3, wherein; said second mobile radio telephone system is a CDMA system.

11. A mobile radio system as claimed in claim 5, wherein; said second mobile radio telephone system is a CDMA system.

12. A mobile radio system as claimed in claim 8, wherein; said second mobile radio telephone system is a CDMA system.

* * * * *